(12) United States Patent
Saruwatari et al.

(10) Patent No.: US 9,296,458 B2
(45) Date of Patent: Mar. 29, 2016

(54) OUTBOARD MOTOR

(71) Applicant: Yamaha Hatsudoki Kabushiki Kaisha, Iwata-shi, Shizuoka (JP)

(72) Inventors: Kimitaka Saruwatari, Shizuoka (JP); Katsumi Ochiai, Shizuoka (JP); Toshio Suzuki, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 61 days.

(21) Appl. No.: 14/297,781

(22) Filed: Jun. 6, 2014

(65) Prior Publication Data

US 2014/0287636 A1     Sep. 25, 2014

Related U.S. Application Data

(63) Continuation of application No. 13/460,856, filed on May 1, 2012, now Pat. No. 8,790,146.

(30) Foreign Application Priority Data

Aug. 30, 2011    (JP) ................................ 2011-187173

(51) Int. Cl.
    *B63H 20/24*      (2006.01)
    *F01N 3/04*      (2006.01)
    *F01N 13/00*      (2010.01)
    *F01N 3/10*      (2006.01)
    *F01P 3/20*      (2006.01)

(52) U.S. Cl.
    CPC .............. *B63H 20/245* (2013.01); *F01N 3/043* (2013.01); *F01N 3/10* (2013.01); *F01N 13/004* (2013.01); *F01N 13/008* (2013.01); *F01N 2590/021* (2013.01); *F01P 3/202* (2013.01); *Y02T 10/20* (2013.01)

(58) Field of Classification Search
    CPC ..... F01N 3/28; F01N 3/2803; F01N 2590/02; F01N 2590/021; F01N 2590/022; B63H 20/245; F01P 3/202
    USPC ............................ 440/89 H, 89 R, 89 G, 89 J
    See application file for complete search history.

(56) References Cited

U.S. PATENT DOCUMENTS

| 6,068,528 | A | 5/2000 | Suzuki |
| 6,884,133 | B2 * | 4/2005 | Ishii ....................... F01N 3/046 440/89 H |

(Continued)

FOREIGN PATENT DOCUMENTS

| JP | 11-101172 A | 4/1999 |
| JP | 2002-256860 A | 9/2002 |
| JP | 2009-197743 A | 9/2009 |

OTHER PUBLICATIONS

Saruwatari et al.; "Outboard Motor"; U.S. Appl. No. 13/460,856, filed May 1, 2012.

*Primary Examiner* — Andrew Polay
(74) *Attorney, Agent, or Firm* — Keating and Bennett, LLP (57) ABSTRACT

An outboard motor includes an exhaust pipe that includes an outer wall section, an inner wall section, a coolant passage, and a constricted section. The inner wall section is arranged inward of the outer wall section. The coolant passage is arranged between the outer wall section and the inner wall section. The constricted section is configured to constrict a flow cross section of the coolant passage. A catalytic converter is housed in the exhaust pipe. A temperature sensor is installed in the constricted section and measures a temperature of a pipe wall of the exhaust pipe.

4 Claims, 11 Drawing Sheets

(56) References Cited

U.S. PATENT DOCUMENTS 8,790,146 B2 * 7/2014 Saruwatari .............. F01N 3/043
　　　　　　　　　　　　　　　　　　440/89 H
2002/0106947 A1 * 8/2002 Ozawa .................... F01N 3/28
　　　　　　　　　　　　　　　　　　440/89 C
2009/0215341 A1 8/2009 Ochiai

* cited by examiner

OUTBOARD MOTOR

BACKGROUND OF THE INVENTION

1. Field of the Invention

The present invention relates to an outboard motor.

2. Description of the Related Art

In recent years, outboard motors equipped with catalytic converters have been introduced to improve environmental performance. In outboard motors equipped with catalytic converters, measures are taken to detect overheating of an exhaust pipe in order to prevent the catalytic converter from being damaged by heat. When overheating is detected, a control is executed to forcefully stop the engine or to issue a warning through an indicator device to inform a driver. In response, the driver then performs an inspection to eliminate the overheating.

When detecting overheating in this way, if incorrect detections of overheating occur frequently, then the detections will become bothersome for a driver who must conduct an inspection every time overheating is detected. Therefore, there is a demand for preventing incorrect detections of overheating. For example, Laid-open Japanese Patent Application No. 11-101172 discloses a watercraft engine exhaust apparatus equipped with an exhaust gas temperature sensor and an exhaust pipe temperature sensor. The exhaust gas temperature sensor measures a temperature of an exhaust gas at a position downstream of a catalytic converter. The exhaust pipe temperature sensor measures a temperature of a pipe wall of the exhaust pipe at a position downstream of the catalytic converter. Incorrect detections are prevented by detecting overheating using detection signals from both the exhaust gas temperature sensor and the exhaust pipe temperature sensor.

SUMMARY OF THE INVENTION

However, with the exhaust apparatus presented in Laid-open Japanese Patent Application No. 11-101172, the number of parts is larger and, thus, the cost is higher because two sensors, i.e., an exhaust gas temperature sensor and an exhaust pipe temperature sensor, must be provided in order to prevent an incorrect detection.

Accordingly, preferred embodiments of the present invention provide an outboard motor that prevents incorrect detections of overheating while also preventing an increase in the number of parts.

An outboard motor according to a preferred embodiment of the present invention includes an engine, an exhaust manifold, an exhaust pipe, a catalytic converter, and a temperature sensor. The engine includes a plurality of cylinders, a plurality of exhaust ports, and a crankshaft. The cylinders are arranged side-by-side above and below one another. The exhaust ports are provided on the cylinders, respectively. The crankshaft is arranged to extend in a vertical direction. The exhaust manifold is connected to the exhaust ports. The exhaust pipe is connected to the exhaust manifold. The exhaust pipe includes an outer wall section, and inner wall section, a coolant passage, and a constricted section. The inner wall section is arranged inward of the outer wall section. The coolant passage is arranged between the outer wall section and the inner wall section. The constricted section is configured to constrict a flow cross section of the coolant passage. The catalytic converter is housed in the exhaust pipe. The temperature sensor is installed in the constricted section. The temperature sensor is configured to measure a temperature of a pipe wall of the exhaust pipe.

In an outboard motor according to this preferred embodiment of the present invention, the temperature sensor is installed in the constricted section of the exhaust pipe. At the constricted section, a flow speed of a coolant is faster because the coolant passage is narrower. Thus, when a flow rate of the coolant in the coolant passage changes, the temperature of the constricted section changes markedly. Consequently, overheating can be detected accurately by arranging for the temperature sensor to measure a temperature of the pipe wall at the constricted section of the exhaust pipe. As a result, incorrect detections of overheating can be significantly reduced while preventing an increase in the number of parts The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
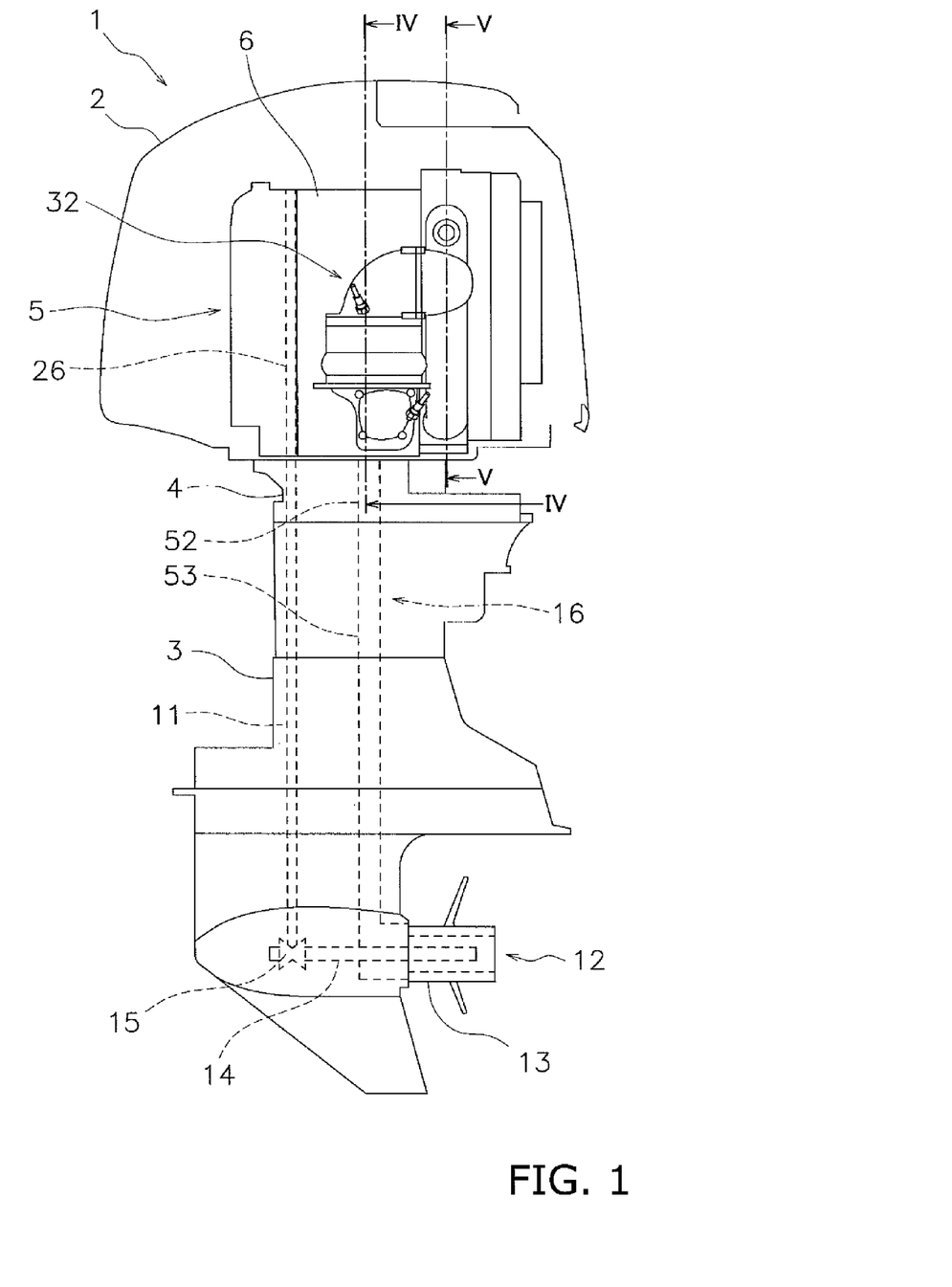
FIG. 1 is a side view of an outboard motor according to a preferred embodiment of the present invention.
Figure 2:
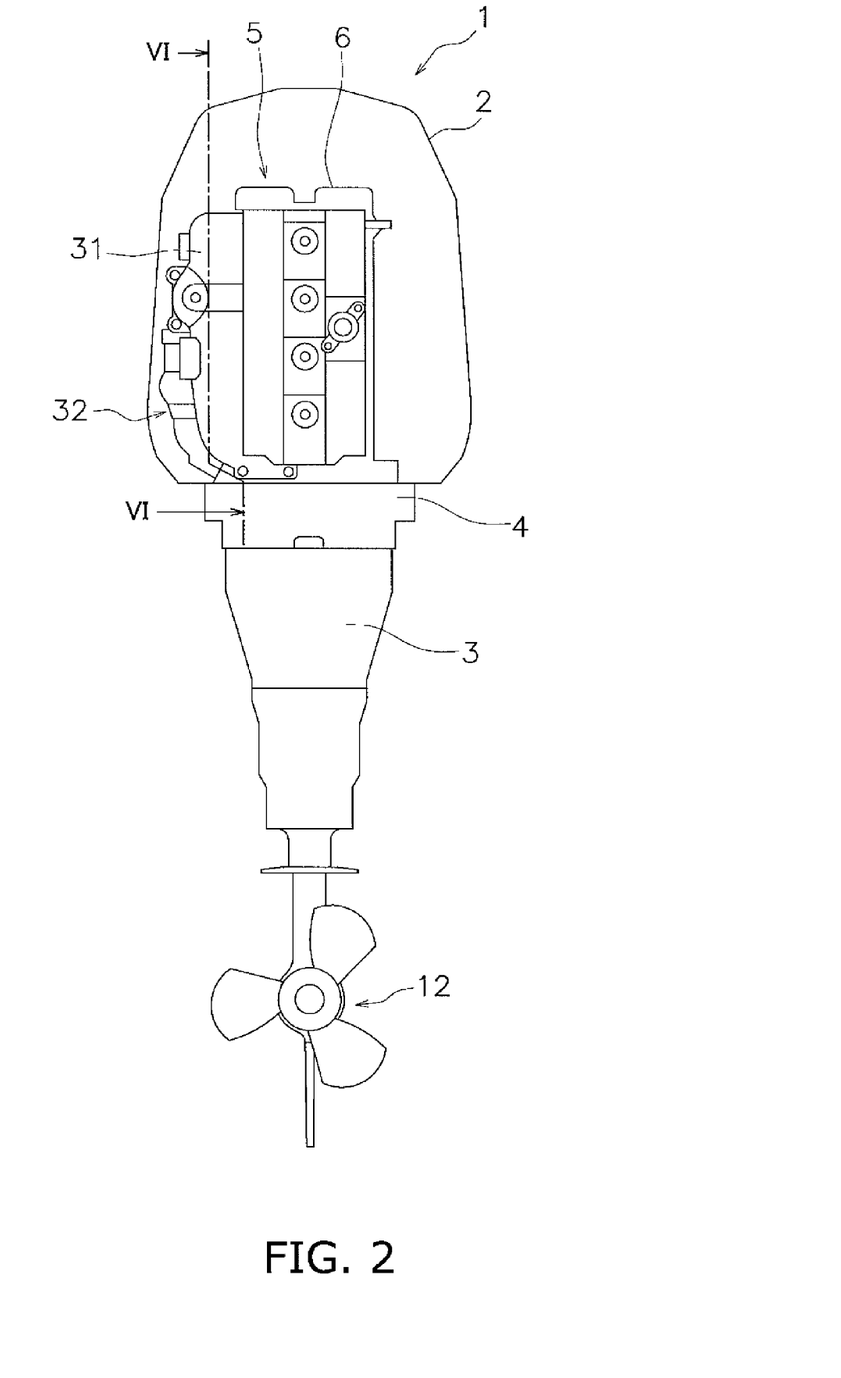
FIG. 2 is a rear view of the outboard motor.

FIG. 1 is a side view of an outboard motor 1 according to a preferred embodiment of the present invention. FIG. 2 is a rear view of the outboard motor 1. As shown in FIG. 1 and FIG. 2, the outboard motor 1 includes an upper casing 2, a lower casing 3, an exhaust guide section 4, and an engine unit 5. In FIG. 1 and FIG. 2, the upper casing 2 is depicted in a cross sectional view in order to facilitate understanding. The upper casing 2, the lower casing 3, and the engine unit 5 are fixed to the exhaust guide section 4.

The engine unit 5 is arranged inside the upper casing 2. The engine unit 5 includes an engine 6. As shown in FIG. 1, a drive shaft 11 is arranged inside the lower casing 3. The drive shaft 11 is arranged along a vertical direction inside the lower casing 3. The drive shaft 11 is fixed to a crankshaft 26 of the engine 6. A propeller 12 is arranged on a lower portion of the lower casing 3. The propeller 12 is arranged below the engine 6. The propeller 12 includes a propeller boss 13. A propeller shaft 14 is arranged inside the propeller boss 13. The propeller shaft 14 is arranged to extend along a longitudinal direction (front-back direction). The propeller shaft 14 is coupled to a lower portion of the drive shaft 11 through a bevel gear 15.

In the outboard motor 1, a drive force generated by the engine 6 is transmitted to the propeller 12 through the drive shaft 11 and the propeller shaft 14. As a result, the propeller 12 is rotated in a forward direction or a reverse direction. In this way, a propulsion force is generated which propels a watercraft hull to which the outboard motor 1 is attached forward or backward.

As shown in FIG. 1, the outboard motor 1 includes an exhaust passage 16. The exhaust passage 16 is arranged such that it extends from the engine 6 to the propeller boss 13 of the propeller 12 through the insides of the exhaust guide section 4 and the lower casing 3. Exhaust gas discharged from the engine 6 passes from the exhaust passage 16 to the water through an inside of the propeller boss 13.

Figure 3:
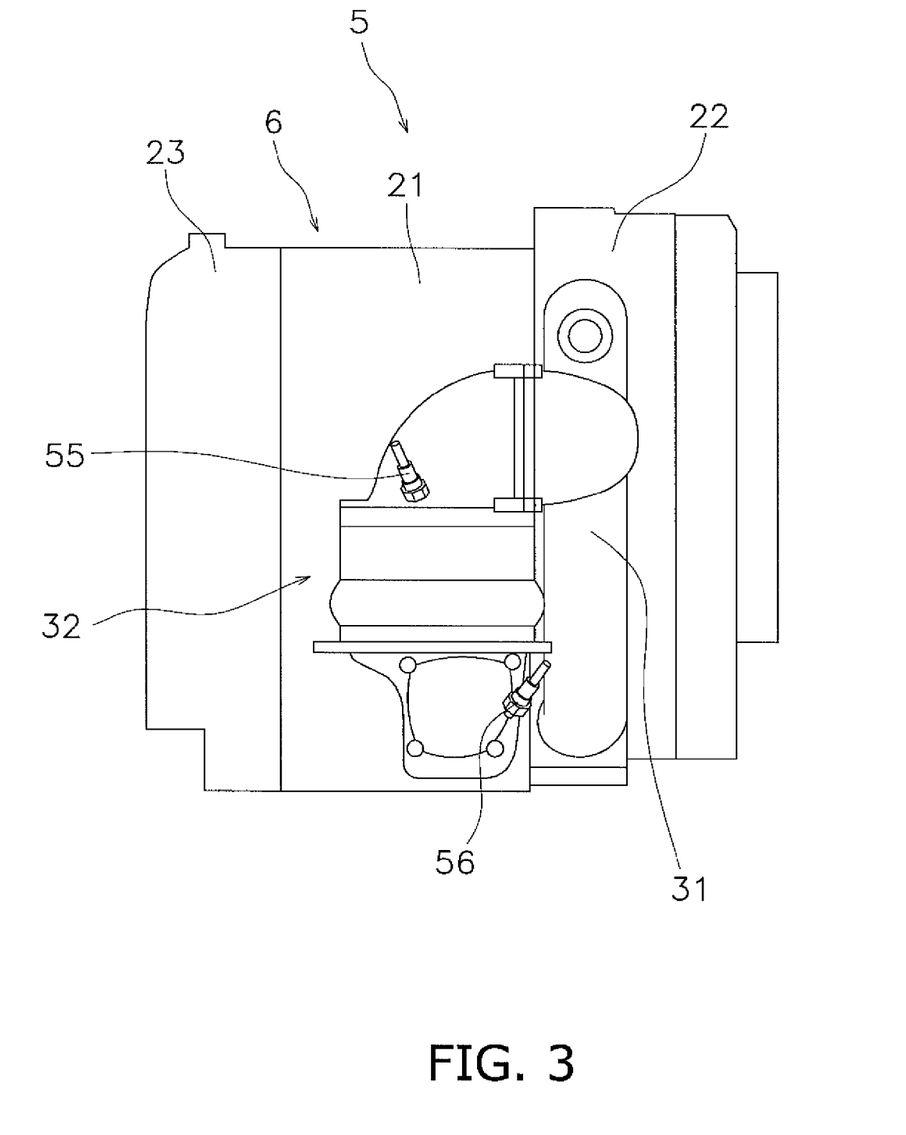
FIG. 3 is a side view of an engine unit.
Figure 4:
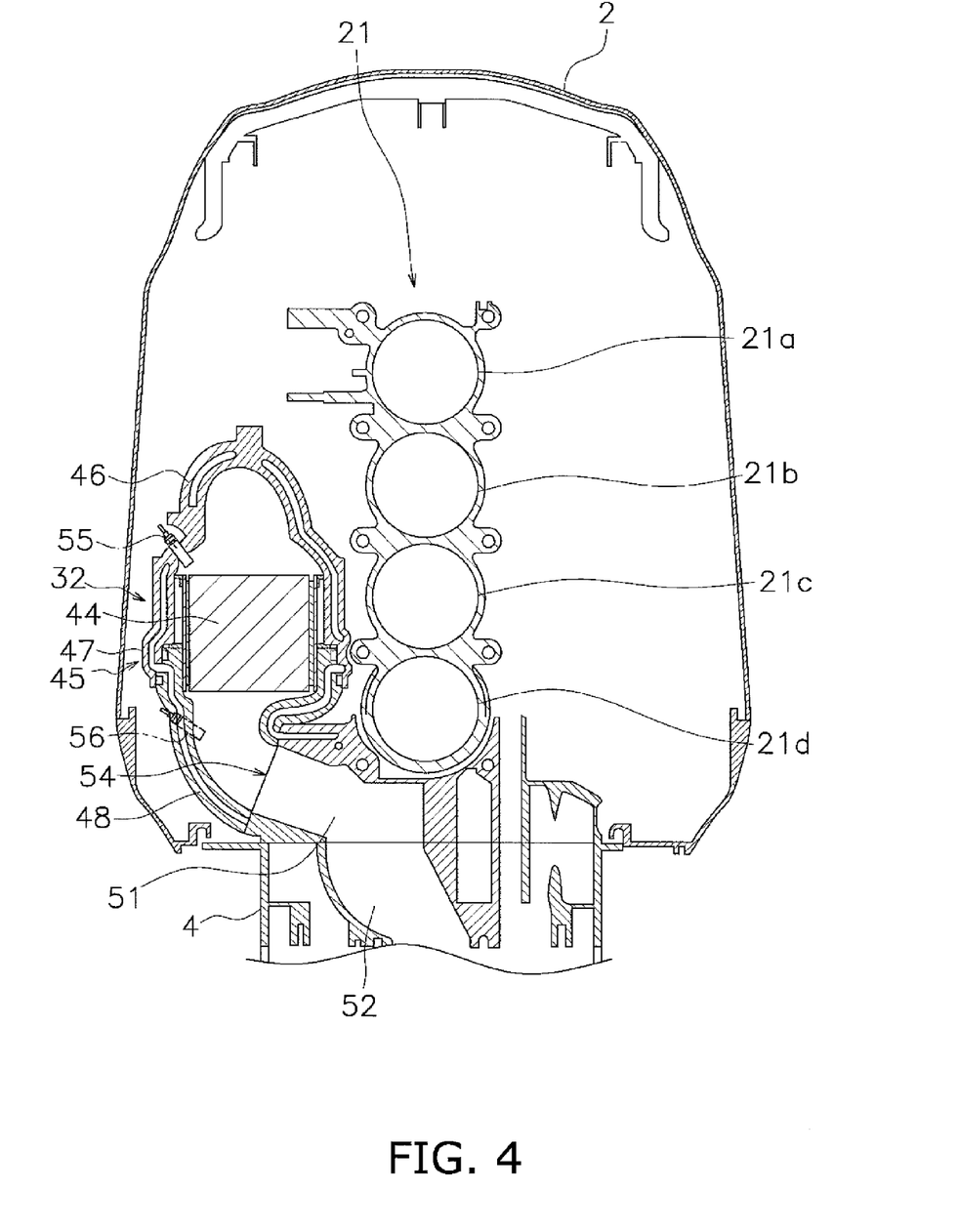
FIG. 4 is a sectional view taken along a section line IV-IV of FIG. 1.

FIG. 3 is a side view of the engine unit 5. As shown in FIG. 3, the engine 6 includes a cylinder block 21, a cylinder head 22, and a crankcase 23. The cylinder block 21 is arranged on the exhaust guide section 4 and is fixed to the exhaust guide 4. FIG. 4 is a sectional view of the outboard motor 1 taken along a section line IV-IV of FIG. 1. As shown in FIG. 4, the cylinder block 21 includes four cylinders 21a to 21d. The four cylinders 21a to 21d are arranged side-by-side above and below one another.

Figure 5:
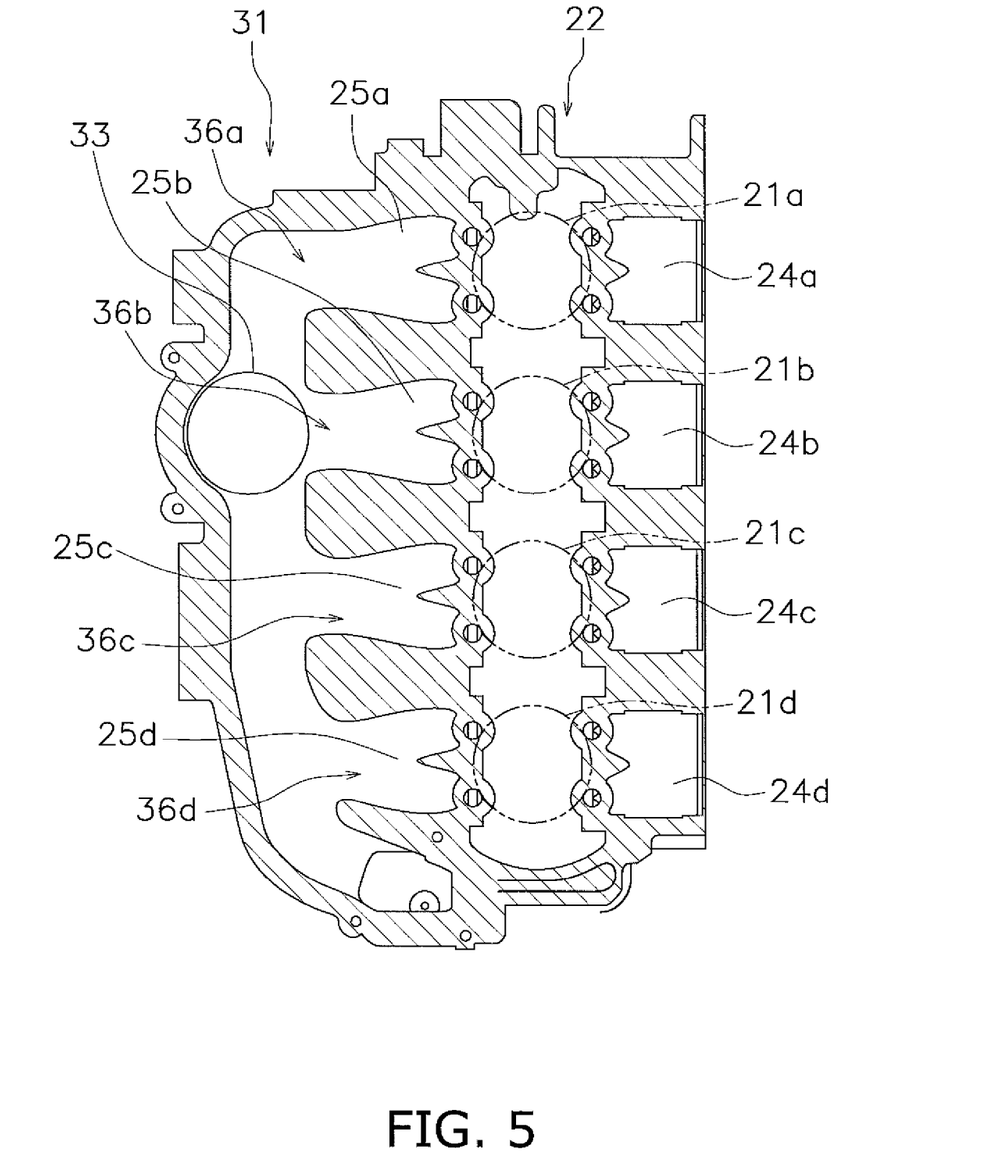
FIG. 5 is a sectional view taken along a section line V-V of FIG. 1.

As shown in FIG. 3, the cylinder head 22 is arranged rearward of the cylinder block 21. FIG. 5 is a sectional view of the outboard motor 1 taken along a section line V-V of FIG. 1. As shown in FIG. 5, intake ports 24a to 24d and exhaust ports 25a to 25d are disposed inside the cylinder head 22. Each of the intake ports 24a to 24d and each of the exhaust ports 25a to 25d are connected to one of the cylinders 21a to 21d, respectively. The intake ports 24a to 24d are arranged vertically above and below one another. The intake ports 24a to 24d are connected to a fuel supplying device not shown in the drawings. The exhaust ports 25a to 25d are arranged vertically above and below one another. The exhaust ports 25a to 25d extend in a lateral direction and connected to an exhaust manifold 31 explained later.

As shown in FIG. 3, the crankcase 23 is arranged frontward of the cylinder block 21. The crankshaft 26 (see FIG. 1) is arranged inside the crankcase 23. The crankshaft 26 extends along a vertical direction. An upper end portion of the drive shaft 11 is connected to a lower end portion of the crankshaft 26. Movement of pistons (not shown) arranged inside the cylinders 21a to 21d is transmitted to the drive shaft 11 through the crankshaft 26.

As shown in FIG. 3, the engine unit 5 includes the exhaust manifold 31. The exhaust manifold 31 is arranged laterally of the cylinder head 22 and on a side of the engine. The exhaust manifold 31 is preferably formed as an integral portion of the cylinder head 22. The exhaust manifold 31 is arranged to extend along a vertical direction. As shown in FIG. 5, a plurality of openings 36a to 36d are provided in the exhaust manifold 31 and the exhaust manifold 31 connects to the exhaust ports 25a to 25d through the openings 36a to 36d, respectively. Exhaust gas discharged from the exhaust ports 25a to 25d collects in the exhaust manifold 31. The exhaust manifold 31 includes a first opening 33. The first opening 33 is positioned between the cylinder 21a positioned highest and the cylinder 21d positioned lowest among the plurality of cylinders 21a to 21d.

Figure 6:
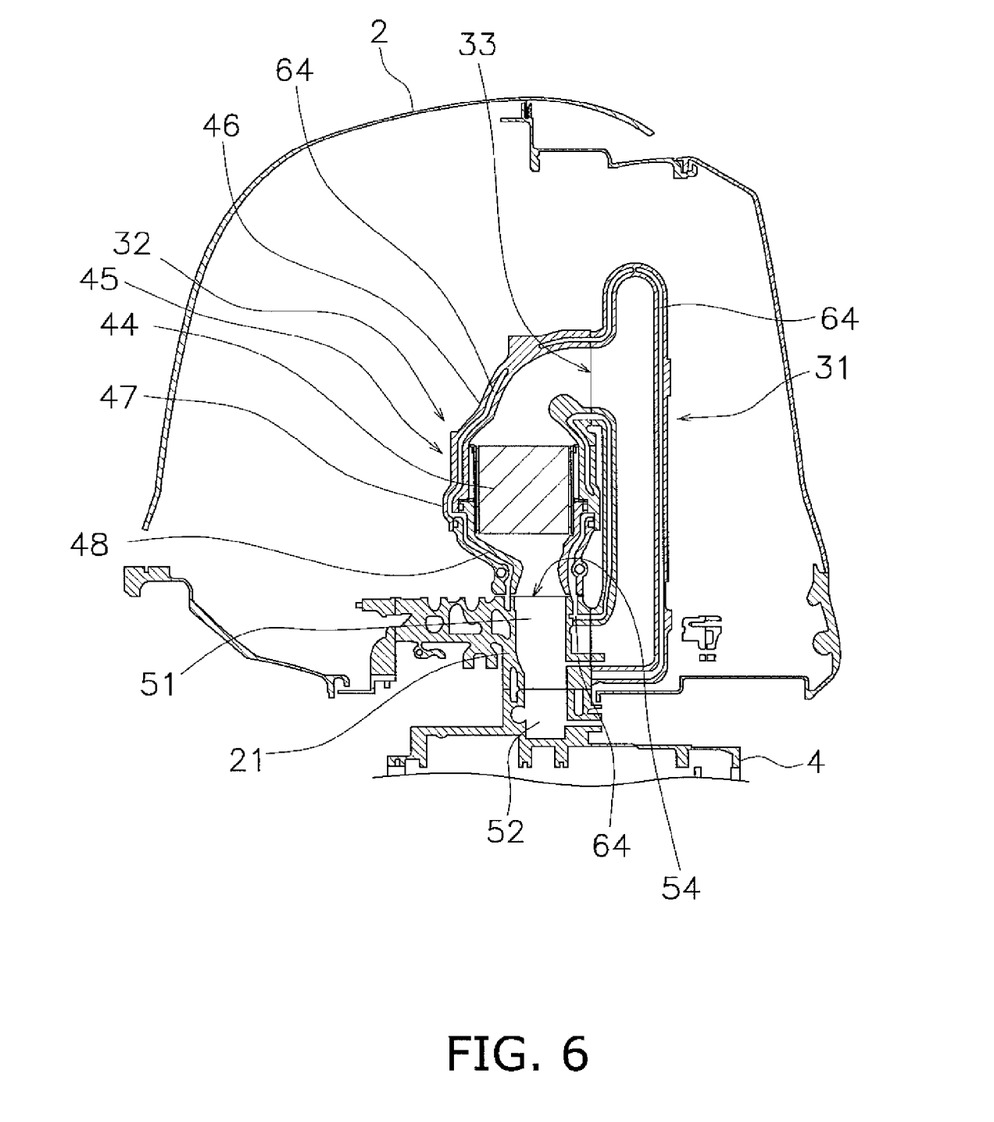
FIG. 6 is a sectional view taken along a section line VI-VI of FIG. 2.

As shown in FIG. 3, the engine unit 5 includes a catalytic converter 32. As shown in FIG. 4 and FIG. 6, the catalytic converter unit 32 includes a catalyst member 44 and a catalyst housing pipe 45. The catalyst member 44 is arranged in the exhaust passage 16 inside the catalyst housing pipe 45. The catalyst housing pipe 45 is an example of the "exhaust pipe" according to a preferred embodiment of the present invention. The catalytic converter unit 32 is arranged laterally of the engine 6. Thus, the catalyst member 44 is arranged laterally of the engine 6. More specifically, the catalyst member 44 is positioned higher than a lower edge portion of the cylinder 21d, which is positioned lowest among the four cylinders 21a to 21d. The catalyst housing pipe 45 is arranged horizontally side-by-side with respect to the exhaust manifold 31. The catalyst housing pipe 45 is arranged to extend in a vertical direction. An end of the catalyst housing pipe 45 is connected to the first opening 33 of the exhaust manifold 31. Another end of the catalytic converter pipe 45 is connected to a second opening 54 of the cylinder block 21 (explained later). The catalyst member 44 supports a catalyst serving to clean exhaust gas. The catalyst preferably is, for example, a three-way catalyst. The catalyst member 44 preferably is a cylindrically shaped member having a honeycomb structure, for example. Exhaust gas flows from above to below through the catalyst member 44. The exhaust gas passing through the exhaust passage 16 is cleaned as it passes through the catalyst member 44 inside the catalyst housing pipe 45. The structure of the catalytic converter unit 32 will be explained in more detail later.

The exhaust manifold 31 and the catalytic converter unit 32 define a portion of the exhaust passage 16. The exhaust passage 16 also includes a first lower passage 51, a second lower passage 52, and a third lower passage 53. The first lower passage 51 is located inside the cylinder block 21. The first lower passage 51 includes a second opening 54. The second opening 54 is located in a lower portion of a side surface of the cylinder block 21. The first lower passage 51 is connected to the catalytic converter unit 32 through the second opening 54. The second lower passage 52 is located inside the exhaust guide section 4. As shown in FIG. 4 and FIG. 6, the second lower passage 52 is connected to the first lower passage 51. As shown in FIG. 1, the third lower passage 53 is located inside the lower casing 3. The third lower passage 53 is connected to the second lower passage 52. The third lower passage 53 is also connected to the propeller boss 13.

In the outboard motor 1 according to this preferred embodiment, exhaust gas discharged from the cylinders 21a to 21d is guided from the cylinders 21a to 21d to underneath the engine 6 by the exhaust passage 16. More specifically, exhaust gas from the exhaust ports 25a to 25d of the engine 6 collects in the exhaust manifold 31. The exhaust gas flows from the exhaust manifold 31 to the catalytic converter unit 32. The exhaust gas is cleaned as it passes through the catalyst member 44 in the catalytic converter unit 32. The exhaust gas then passes through the first lower passage 51, the second lower passage 52, the third lower passage 53, and the inside of the propeller boss 13 and is discharged to the outside.

As shown in FIG. 3 and FIG. 4, the catalytic converter unit 32 is equipped with a first oxygen sensor 55 and a second oxygen sensor 56 to detect an oxygen concentration of the exhaust gas. The first oxygen sensor 55 is arranged upstream of the catalyst member 44 inside the exhaust passage 16. More specifically, the first oxygen sensor 55 is arranged above the catalyst member 44 inside the catalyst housing pipe 45. The second oxygen sensor 56 is arranged below the catalyst member 44 inside the catalyst housing pipe 45. The second oxygen sensor 56 is arranged downstream of the catalyst member 44 inside the exhaust passage 16. Detection signals from the first oxygen sensor 55 and the second oxygen sensor 56 are fed to an ECU not shown in the drawings. The ECU controls the engine 6 based on detection values from the first oxygen sensor 55 and the second oxygen sensor 56.

Figure 7:
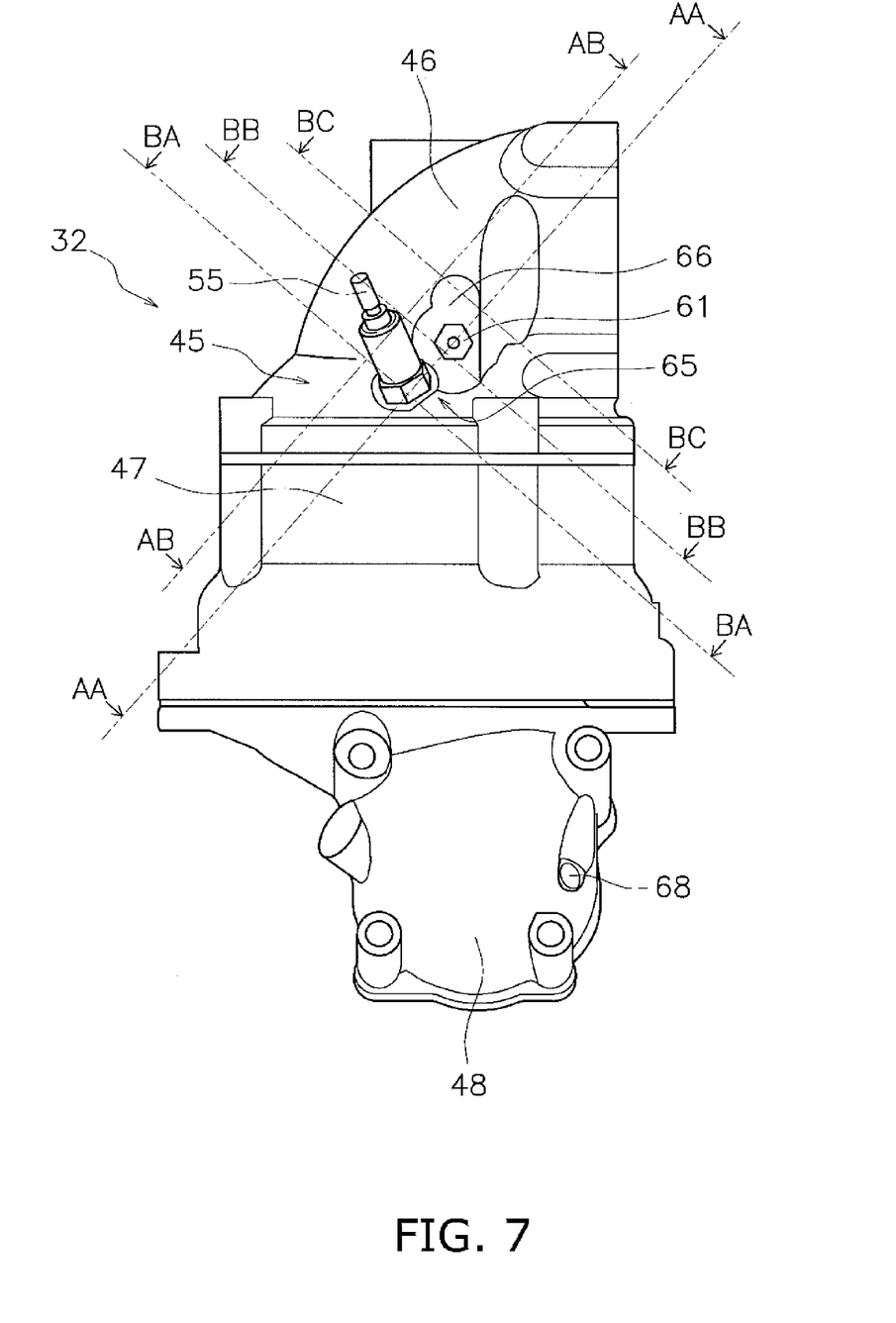
FIG. 7 is a side view of a catalytic converter unit.
Figure 8:
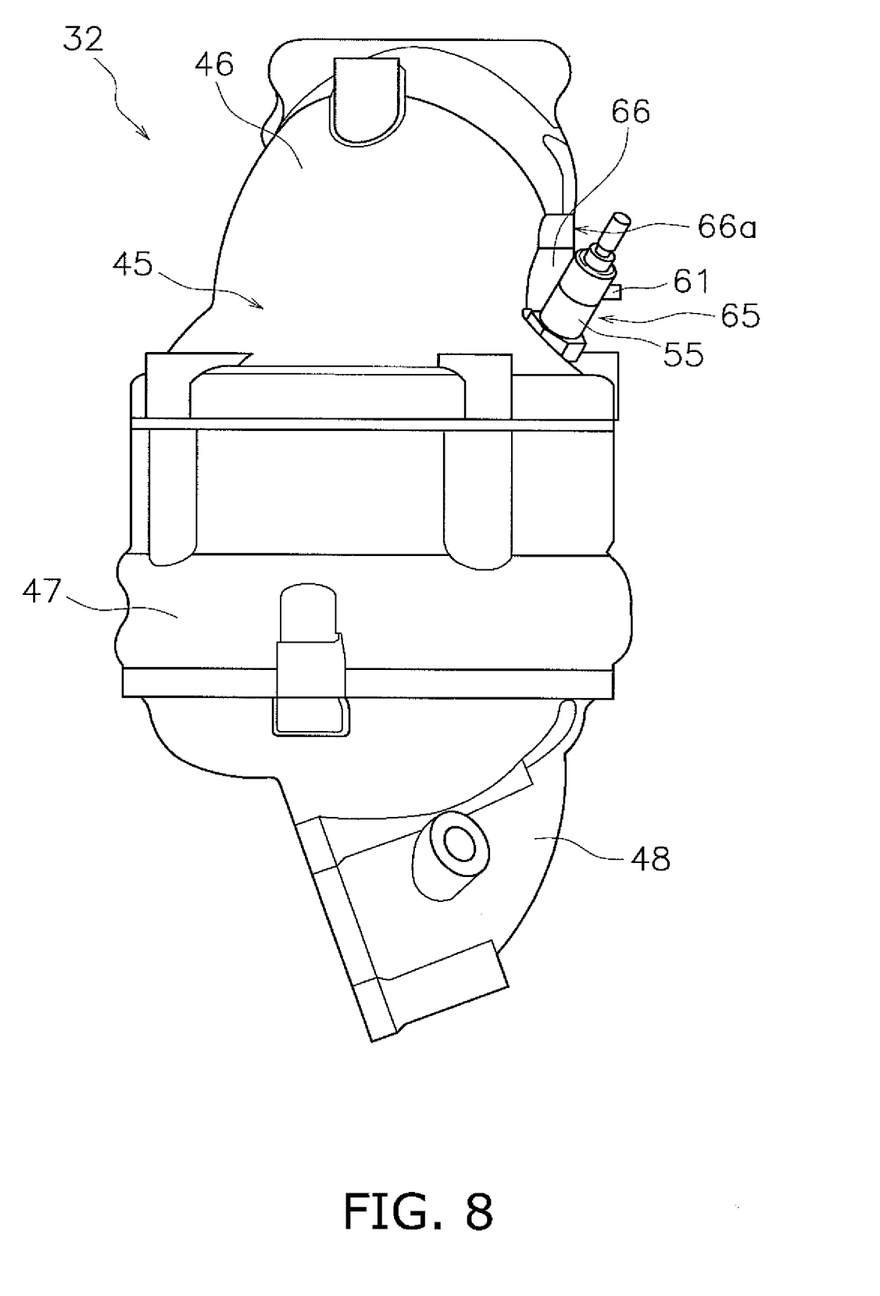
FIG. 8 is a frontal view of the catalytic converter unit.
Figure 9:
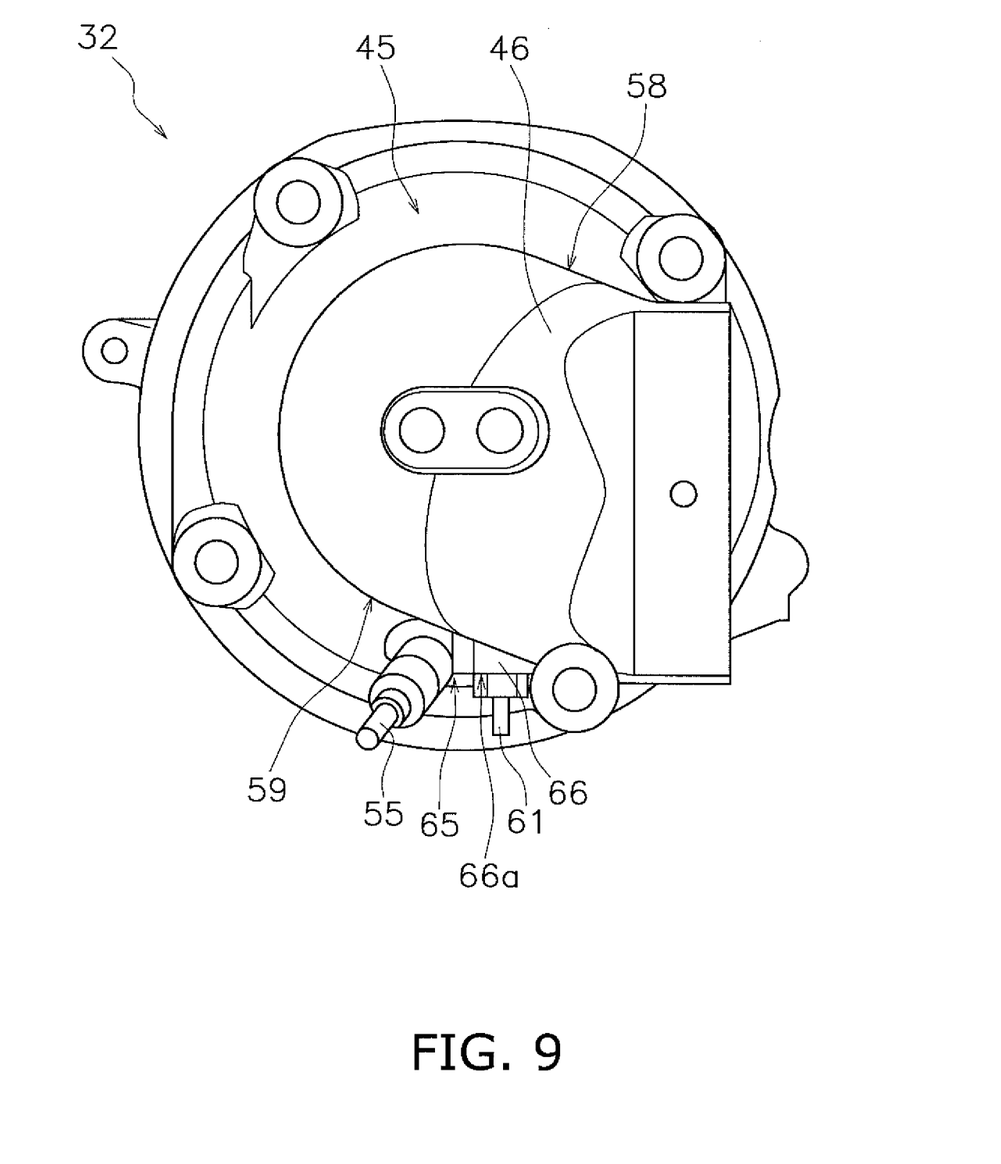
FIG. 9 is atop plan view of the catalytic converter unit.

The structure of the catalytic converter unit 32 will now be explained in more detail. FIG. 7 is a side view of the catalytic converter unit 32. FIG. 8 is a frontal view of the catalytic converter unit 32. FIG. 9 is a top plan view of the catalytic converter unit 32.

The catalyst housing pipe 45 includes a first curved section 46, a straight section 47, and a second curved section 48. The first curved section 46 is configured to curve toward the first opening 33 of the exhaust manifold 31. The straight section 47 is configured to extend straight in a vertical direction. The straight section 47 is arranged below the first curved section 46. The catalyst member 44 is arranged inside the straight section 47. The second curved section 48 is arranged below the straight section 47. The second curved section 48 is configured to curve toward the second opening 54 of the cylinder block 21. As shown in FIG. 9, the catalyst housing pipe 45 includes a first side surface 58 that faces the engine 6 and a second side surface 59 that is farther from the engine 6 than the first side surface 58. A temperature sensor 61 is installed in the second side surface 59 of the catalyst housing pipe 45. The temperature sensor 61 measures a temperature of a pipe wall of the catalyst housing pipe 45. The ECU (not shown in the drawings) determines if overheating of the engine 6 is occurring based on a detection value of the temperature sensor 61. The first oxygen sensor 55 is installed in the second side surface 59 of the catalyst housing pipe 45.

Figure 10A:
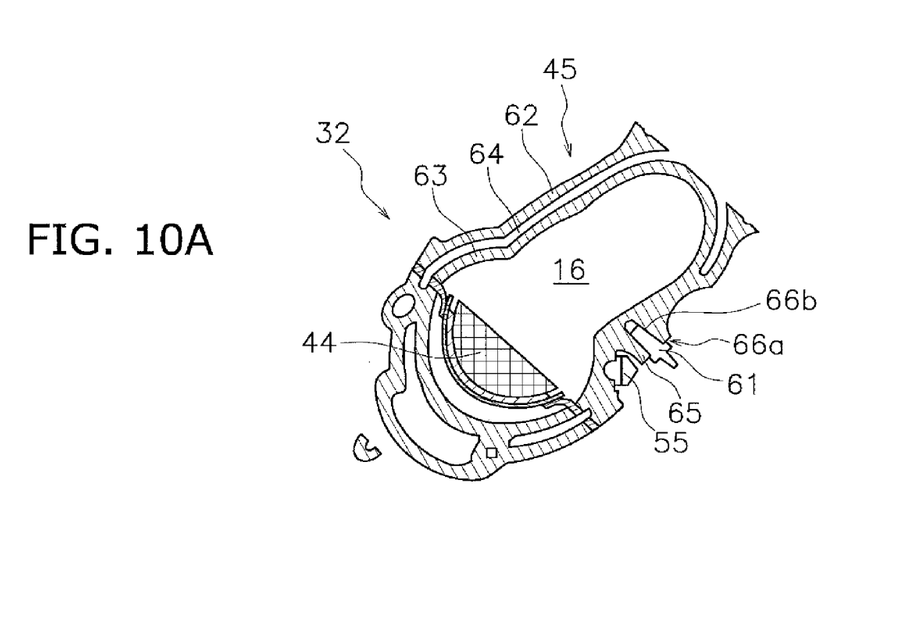
FIGS. 10A and 10B are sectional views of the catalytic converter unit.
Figure 10B:
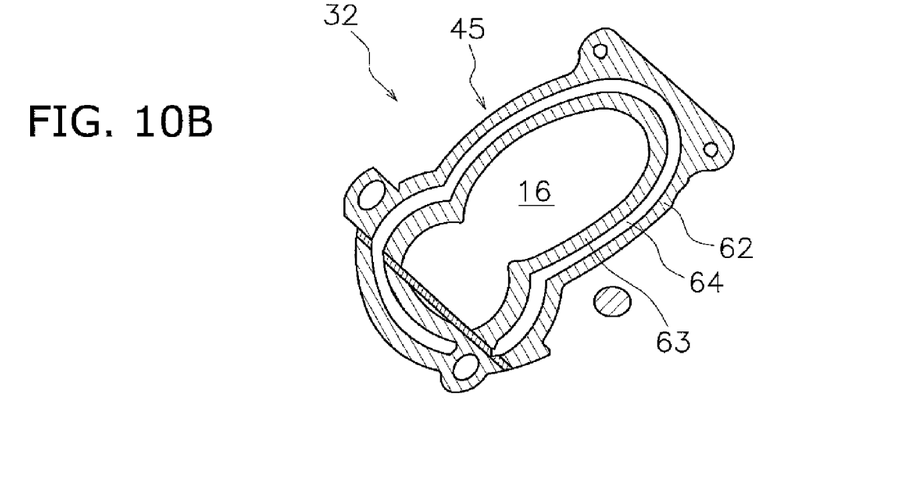
Figure 11A:
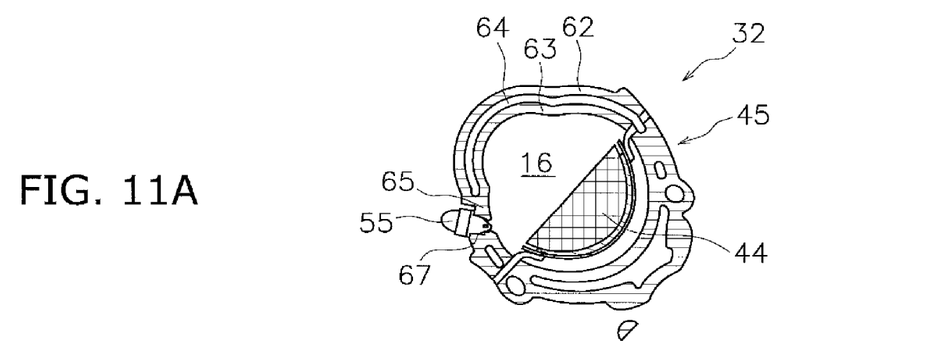
FIGS. 11A-11C are sectional views of the catalytic converter unit.
Figure 11B:
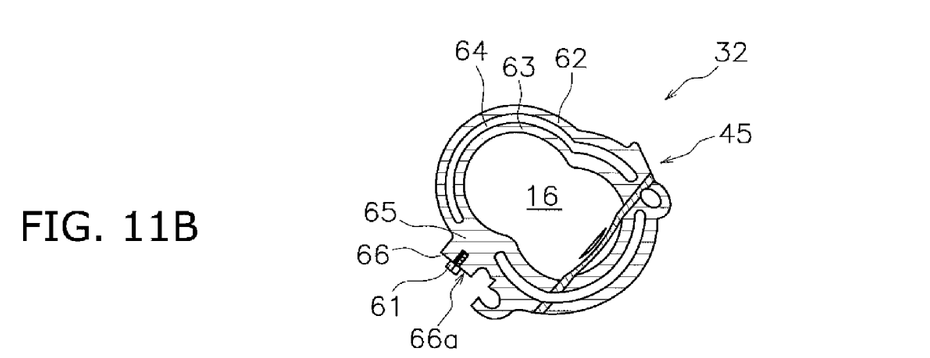
Figure 11C:
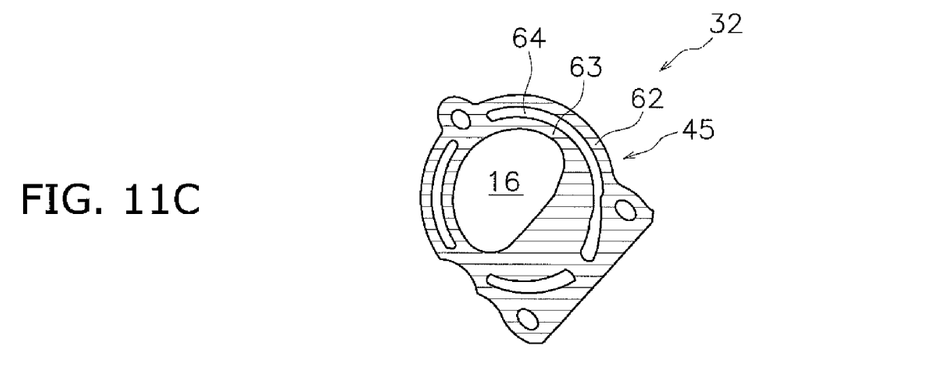

FIG. 10A is a sectional view taken along a section line AA-AA of FIG. 7. FIG. 10B is a sectional view taken along a section line AB-AB of FIG. 7. FIG. 11A is a sectional view taken along a section line BA-BA of FIG. 7. FIG. 11B is a sectional view taken along a section line BB-BB of FIG. 7. FIG. 11C is a sectional view taken along a section line BC-BC of FIG. 7. As shown in FIGS. 10A, 10B and FIGS. 11A-11C, the catalytic housing pipe 45 includes an outer wall section 62, an inner wall section 63, and a coolant passage 64. The inner wall section 63 is arranged inward of the outer wall section 62. The coolant passage 64 is arranged between the outer wall section 62 and the inner wall section 63. A coolant flows through the coolant passage 64. The catalytic converter unit 32 is cooled by the coolant in the coolant passage 64. As shown in FIG. 6, coolant passages 64 are also provided inside the cylinder block 21 and the exhaust manifold 31. The coolant passage 64 of catalytic converter unit 32 communicates with the coolant passage 64 of the cylinder block 21 and the coolant passage 64 of the exhaust manifold 31.

As shown in FIG. 10A, FIG. 11A, and FIG. 11B, the catalyst housing pipe 45 includes a constricted section 65. The constricted section 65 is a portion of the catalyst housing pipe 45 where the coolant passage 64 is not provided and constitutes a rib connecting the inner wall section 63 and the outer wall section 62 together. Consequently, a flow cross section of the coolant passage 64 is reduced at the constricted section 65. In other words, the constricted section 65 constricts the flow cross section of the coolant passage 64. As shown in FIG. 9, the constricted section 65 is provided at the second side surfaces 59. The constricted section 65 is also provided at the first curved section 46. Therefore, the constricted section 65 is arranged upstream of the catalyst member 44 in the catalyst housing pipe 45. The constricted section 65 is positioned above the catalyst member 44.

The constricted section 65 includes a protruding section 66 and a hole 67 (see FIG. 11A). As shown in FIG. 9, the protruding section 66 protrudes outward of the catalyst housing pipe 45 from an external surface of the catalyst housing pipe 45. The protruding section 66 includes a flat surface 66a. As shown in FIG. 10A, a hole 66b is formed in the flat surface 66a. The hole 66b is configured to recede inward toward the inside of the catalyst housing pipe 45 from the flat surface 66a. The hole 66b does not communicate with the exhaust passage 16 inside the catalyst housing pipe 45 and a bottom of the hole 66b is closed. The temperature sensor 61 is installed in the hole 66b of the flat surface 66a. As shown in FIG. 11B, a thickness of the catalyst housing pipe 45 at the protruding section 66 is larger than a thickness of the catalyst housing pipe 45 at other portions.

As shown in FIG. 11A, the hole 67 communicates with the exhaust passage 16 inside the catalyst housing pipe 45. The first oxygen sensor 55 is installed in the hole 67 of the constricted section 65. As shown in FIG. 7, the second curved section 48 includes a hole 68 similar to the hole 67 of the first curved section 46. As shown in FIG. 3, the second oxygen sensor 56 is installed in the hole 68 of the second curved section 48.

In the outboard motor 1 according to this preferred embodiment, the temperature sensor 61 is preferably installed in the constricted section 65 of the catalyst housing pipe 45. At the constricted section 65, a flow speed of the coolant is faster because the coolant passage 64 is narrower. Thus, when a flow rate of the coolant in the coolant passage 64 changes, the temperature of the constricted section 65 changes markedly. Consequently, overheating can be detected accurately by arranging for the temperature sensor 61 to measure a temperature of the pipe wall at the constricted section 65 of the catalyst housing pipe 45. As a result, incorrect detections of overheating can be significantly reduced while preventing an increase in the number of parts.

Since the first oxygen sensor 55 is inserted inside the exhaust passage 16, it is necessary to provide a hole 67 that passes through the wall portion of the catalyst housing pipe 45 in order to install the first oxygen sensor 55 in the catalyst housing pipe 45. Since the coolant passage 64 is not arranged in the constricted section 65, the hole 67 can easily be formed such that it passes through to the exhaust passage 16 inside the catalyst housing pipe 45. Thus, the constricted section 65 can also serve as a mounting section for the temperature sensor 61 and a mounting section for the first oxygen sensor 55.

Since the constricted section 65 is a rib connecting the inner wall section 63 and the outer wall section 62, the thickness of the catalyst housing pipe 45 at the constricted section 65 is larger than the thickness of the catalyst housing pipe 45 at other portions. Consequently, the thermal capacity of the constricted section 65 is larger than the thermal capacity of the other portions and a decline in the resistance to heat can be prevented even though the coolant passage 64 is not provided in the constricted section 65.

The constricted section 65 is preferably provided at the first curved section 46. Since the exhaust passage 16 is curved at the first curved section 46, the exhaust gas readily strikes against the constricted section 65. Consequently, the temperature sensor 61 can measure a temperature of the pipe wall accurately.

The constricted section 65 is preferably provided at the second side surface 59 of the catalyst housing pipe 45. Consequently, the catalytic converter unit 32 can be arranged closer to the engine 6 than if the constricted section 65 were provided at the first side surface 58. As a result, the engine 6 and the catalytic converter 32 can be arranged in a more compact fashion.

Although a preferred embodiment of the present invention has been described above, the present invention is not limited to the preferred embodiment described above. Various changes can be made without departing from the scope of the present invention.

The number of cylinders is not limited to four. Having three or fewer cylinders is also acceptable. It is also acceptable to have five or more cylinders. Although in the previously explained preferred embodiment, the constricted section 65 is preferably provided at the first curved section 46, it is also acceptable to provide the constricted section 65 at the straight section 47 or another portion, for example. Although in the previously explained preferred embodiment, the constricted section 65 is preferably provided at the second side surface 59 of the catalyst housing pipe 45, it is also acceptable to provide the constricted section 65 at the first side surface 58. However, as explained previously, it is preferable to provide the constricted section 65 at the second side surface 59 from the standpoint of arranging the engine 6 and the catalytic converter unit 32 in a compact fashion. It is also acceptable to provide the constricted section 65 at a front surface of the catalyst housing pipe 45.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An outboard motor comprising:
    an engine including a plurality of cylinders arranged side-by-side above and below one another, a plurality of exhaust ports provided on the plurality of cylinders, and a crankshaft extending in a vertical direction;
    an exhaust manifold connected to the exhaust ports;
    an exhaust pipe connected to the exhaust manifold, the exhaust pipe including an outer wall section, an inner wall section located inward of the outer wall section, a coolant passage located between the outer wall section and the inner wall section, and a constricted section that constricts a flow cross-section of the coolant passage;
    a catalytic converter housed in the exhaust pipe; and
    a temperature sensor located in the constricted section to measure a temperature of a pipe wall of the exhaust pipe; wherein
    the constricted section and the temperature sensor are upstream of the catalytic converter in the exhaust pipe.

2. The outboard motor according to claim 1, further comprising:
    an oxygen sensor that detects an oxygen concentration of exhaust gas from the exhaust ports; wherein
    the constricted section includes a hole that passes through to an inside of the exhaust pipe; and
    the oxygen sensor is located in the hole of the constricted section.

3. The outboard motor according to claim 1, wherein the exhaust pipe includes a curved section having a curved shape and the constricted section is provided at the curved section.

4. The outboard motor according to claim 1, wherein
    the exhaust pipe is located laterally relative to the engine;
    the exhaust pipe includes a first side surface that faces the engine and a second side surface that is farther away from the engine than the first side surface; and
    the constricted section is located at the second side surface.

* * * * *